United States Patent Office 3,167,393
Patented Jan. 26, 1965

3,167,393
METHOD OF PRODUCING PURE SINGLE
CRYSTALS OF GRAPHITE
Armando A. Giardini, New Shrewsbury, and John E. Tydings, Keyport, N.J., assignors to the United States of America as represented by the Secretary of the Army
No Drawing. Filed Apr. 5, 1962, Ser. No. 185,483
16 Claims. (Cl. 23—209.1)
(Granted under Title 35, U.S. Code (1952), sec. 266)

The invention described herein may be manufactured and used by or for the Government for governmental purposes without the payment of any royalty thereon.

The present invention relates to a process for producing single crystals of graphite of high quality.

The process consists essentially of dissolving carbon under conditions of high pressures and high temperatures in a suitable non-metallic solvent. Solution of carbon is carried out in a fused salt, or mixture of salts, to a state of saturation. The solution is thereupon cooled (while maintaining elevated pressure) to induce precipitation of free carbon, which recrystallizes as crystals of graphite. The temperature of the reaction is then reduced to normal, followed by lowering of pressure to normal. It has been found that pressures and temperatures in the order of several thousand atmospheres and hundreds of degrees centigrade, respectively are desirable in carrying out this process.

It is therefore an object of this invention to provide a method whereby carbonaceous materials may be converted to graphite crystals of high quality.

It is a further object of the invention to provide a method for producing graphite crystals by dissolving carbonaceous material in fused salts at high temperature and pressure and crystallizing the graphite from the solution.

It has been found that the carbon dissolved at high pressure and temperature by the classes of solvents described in this process is completely precipitated from solution. In addition, the solvents are readily soluble in either water or dilute common acids. Since carbon is essentially inert chemically, the solvent salts may be readily separated from the recrystallized graphite end product, and recovered for later use.

Some solvents which have been found effective for the solution, precipitation and recrystallization of carbon as well-formed graphite crystals at high pressures and high temperatures are ammonium halides, ammonium phosphates, ammonium sulfates and borate salts. Some respective specific examples are $NH_4Cl$, $NH_4H_2PO_4$ and $Na_2B_4O_7$.

As a general rule, it is believed that salts or compounds which possess the ammonium radical, phosphate radical or borate radical, and which do not contain elements which form stable carbides or carbon compounds under conditions of high pressures and temperatures, are suitable as carbon solvents in this process.

If crystals of chemically pure graphite are desired, it is recommended that chemically pure reactants are used, as well as carbon solvents which do not contain elements prone either to form carbon compounds or to be easily included within the graphite crystal structure. Ammonium chloride has been found to be especially effective as a carbon solvent for producing graphite crystals of high chemical purity and crystal perfection.

All experimental research reported herein has been carried out in high pressure-high temperature apparatuses similar to that described in U.S. Patent No. 2,995,776 (Giardini and Tydings); however, any device capable of generating and maintaining concurrent pressures and temperatures in the order of several thousand atmospheres and 1000 to 2000° C., respectively, would be sufficient.

Analytical techniques used to evaluate reactions and reaction products consists of the various aspects of microscopy, spectroscopy and X-ray diffraction.

Pressures and temperatures to be given below have been determined on the basis of electrical resistance methods on pure bismuth, thallium, barium and manganin alloy as a function of pressure. Temperatures have been measured by the use of platinum-platinum (13% rhodium) thermocouples and the pressure-corrected melting points of pure gold, nickel and platinum.

In carrying out the process of dissolving carbon and its recrystallization, the general procedure is to place a charge of solvent, for example, ammonium chloride, either pure or with various amounts of carbon or other salts admixed, within the bore of a polycrystalline carbon hollow right circular cylinder provided with carbon end plugs. However, any carbon capsule geometry which isolates the salt from other constituents in the high pressure cavity of the apparatus would be suitable. The salt-containing carbon capsule is then placed within the bore of a section of compressible, fine grained, thermally and electrically insulating solid such as pyrophyllite alumina or magnesia. The latter assembly is then placed within the reaction cavity of the high pressure—high temperature apparatus, as in the general arrangement disclosed in Patent No. 2,995,776, and pressure is applied and maintained on the specimen—for example, 60,000 atmospheres. The temperature is then raised, for example to 1600° C. either by passing electrical current directly through the carbon capsule or through a surrounding furnace resistance heater coil or tube. Heat is applied to the specimen until the solvent fuses and dissolves carbon. After the desired degree of solution of carbon into the fused salt or salt mixture, the temperature is lowered in order to induce saturation and precipitation of graphite from the carbon-salt solution. During this part of the process the pressure is maintained on the capsule until it cools.

Other variations of pressure and temperature control to bring about carbon saturation and precipitation may be used; for example, maintaining a steady-state high temperature on the fused salt to achieve carbon supersaturation of the solution with subsequent decomposition and precipitation of free carbon for recrystallization to crystals of graphite. The former method, however, has been found to be preferable because of the reduced probability of contamination by diffusion of foreign elements present in the reaction cavity.

Upon completion of precipitation and recrystallization of carbon from the carbon-salt solution, the temperature is lowered to normal, followed by reduction of pressure to normal. The sample is then recovered. The unreacted carbon is scraped away or otherwise removed and the salt-recrystallized graphite mixture treated with a solvent to wash away the salt (e.g., warm water for $NH_4Cl$) and cleanse the graphite crystals.

Graphite crystals of high chemical purity and excellent crystal perfection have been grown by this process. Fundamental causes for the success of the process are not fully understood. It is thought, however, that both the ionic nature of the solvent and the fluidity of the solution under the conditions of high pressure and high temperature used contributed to the high carbon solubility and complete precipitation and recrystallization to the dissolved carbon.

It has been found desirable in some cases to jacket the carbon-salt reactants with a thin walled metallic container prior to installation within the high pressure-high temperature apparatus in order to prevent possible contamination of the reactants by intrusion of the surrounding compressible thermal and electrical insulating solids which are used in the apparatus. The use of metal jackets has been found effective to prevent injection or flowage of environmental constituents when conditions of excessive shear or temperatures are encountered within the reaction cavity. Prudent selection of metals must be observed, however, so that they are not incorporated within the chemical reaction under discussion herein. Platinum, molybdenum and tantalum are examples of the metals found to be effective as jacketing materials.

Some specific examples of reactions carried out at this laboratory are given below:

Example 1

A charge of ammonium chloride is placed with and fully enclosed by a container of high purity carbon, for example, spectrographic grade carbon. The latter is pressurized to approximately 60,000 atmospheres, heated to approximately 1650° C. until fusion of the salt and the desired degree of carbon solution has occurred (the latter can be readily monitored empirically by large changes in the electrical characteristics of the circuit when current is passed directly through the carbon of the reaction, or by thermocouple circuits otherwise), and then the reaction is quickly cooled to approximately 750° C. so as to cause precipitation and recrystallization of carbon from the solution in the form of graphite crystals. The temperature is then lowered to normal followed by lowering of pressure to normal. Extractive and recovery procedures have been described earlier.

Example 2

A mixture of ammonium di-hydrogen phosphate and fine-grained polycrystalline graphite in a weight ratio of approximately 5:1, respectively, is placed within an enclosing container of fine-grained polycrystalline graphite. The latter is made sufficiently large so that at all times during the process reactants are separated from other materials in the apparatus by a surplus of unreacted carbon. The reactants are subjected to approximately 70,000 atmospheres of pressure, heated to approximately 1700° C. only until fusion of the salt and sufficient solution of carbon has occurred (for example, held at 1700° C. for approximately one-half minute), and then cooled to room temperature over a period of approximately 5 minutes. The pressure is then lowered to normal and the specimen recovered.

Example 3

A charge of dehydrated sodium borate is placed within a pure carbon container. The latter in turn is placed within a thin-walled tantalum tube. The specimen is placed within the reaction cavity and pressurized to approximately 65,000 atmospheres and thereupon heated to about 1600° C. held for one minute and cooled to room temperature. The pressure is then reduced to normal and the sample recovered by established techniques.

Example 4

A mixture of ammonium iodide and ammonium chloride is placed within a graphite capsule, subjected to 70,000 atmospheres of pressure, heated to approximately 1700° C. and quenched. Pressure is reduced to normal and sample recovered.

Example 5

A mixture of ammonium chloride and nickel chloride hexamine and carbon are placed within a graphite container, subjected to about 75,000 atmospheres of pressure, heated until a significant and abrupt change in electrical characteristics of the reactants occur, reflecting fusion of the salts and solution of carbon, thereupon cooled to room temperature followed by a lowering of the pressure to normal and recovery of the sample.

Example 6

Other solvents, either singly or mixed, which have been reacted with carbon in the course of this work are: ammonium bi-fluoride, ammonium iodide, ammonium bromide, cobalt chloride diamine, and ammonium lithium chloride.

Some uses for the graphite crystals resulting from the above process are:

(a) For use in the construction of precision electrical resistance elements in electronics.

(b) For use as refractory liners in high temperature applications such as rocket engines.

(c) For use as control elements in nuclear reactors.

(d) As a source of graphite of high chemical purity for chemical use.

(e) As a source of graphite of controlled chemical purity and high structural perfection for structural and fabrication uses.

Various modifications of the process steps and/or the ingredients may be made without departing from the scope of the invention as defined in the following claims.

We claim:

1. The process of preparing graphite crystals comprising: charging a container of carbon with a solvent for carbon from the group consisting of ammonium chloride, ammonium iodide, ammonium bromide, ammonium lithium chloride, ammonium di-hydrogen phosphate, dehydrated sodium borate, nickel chloride hexamine and cobalt chloride diamine; subjecting said container to about 60,000 atmospheres of pressure; heating said container to approximately 1600° C.; cooling said container to room temperature while maintaining said pressure; and reducing said pressure to normal.

2. The process of claim 1 wherein said container is charged with a mixture of said carbon solvents from said group.

3. The process of claim 2 wherein said carbon solvent is a mixture of ammonium iodide and ammonium chloride.

4. The process of claim 2 wherein said carbon solvent is a mixture of ammonium chloride and nickel chloride hexamine.

5. The process of claim 2 wherein said container is graphite.

6. The process of claim 2 wherein said container is enclosed in a jacket of metal from the group consisting of platinum, molybdenum and tantalum before pressure is applied.

7. The process of claim 1 wherein said carbon solvent is ammonium chloride.

8. The process of claim 1 wherein said carbon solvent is ammonium di-hydrogen phosphate.

9. The process of claim 1 wherein said carbon solvent is dehydrated sodium borate.

10. The process of claim 1 wherein said carbon solvent is ammonium bi-fluoride.

11. The process of claim 1 wherein said carbon solvent is ammonium iodide.

12. The process of claim 1 wherein said carbon solvent is ammonium bromide.

13. The process of claim 1 wherein said carbon solvent is cobalt chloride diamine.

14. The process of claim 1 wherein said carbon solvent is ammonium lithium chloride.

15. The process of claim 1 wherein said container is enclosed in a jacket of metal from the group consisting of platinum, molybdenum and tantalum before pressure is applied.

16. The process of claim 1 wherein said container is graphite.

References Cited by the Examiner

UNITED STATES PATENTS

| | | | |
|---|---|---|---|
| 2,544,414 | 3/51 | Zridgman et al. | 23—209.1 |
| 2,941,247 | 6/60 | Bundy | 23—209.1 |
| 2,941,248 | 6/60 | Hall | 23—209.1 |

MAURICE A. BRINDISI, *Primary Examiner.*